United States Patent
LeWinter et al.

(10) Patent No.: US 8,695,439 B2
(45) Date of Patent: *Apr. 15, 2014

(54) DUAL PICK-OFF VIBRATORY FLOWMETER

(75) Inventors: Adam LeWinter, Boulder, CO (US); Anthony William Pankratz, Arvada, CO (US); Roger Scott Loving, Boulder, CO (US); Leah Schultze, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 326 days.

This patent is subject to a terminal disclaimer.

(21) Appl. No.: 12/922,738

(22) PCT Filed: Apr. 16, 2008

(86) PCT No.: PCT/US2008/060476
§ 371 (c)(1),
(2), (4) Date: Sep. 15, 2010

(87) PCT Pub. No.: WO2009/120223
PCT Pub. Date: Oct. 1, 2009

(65) Prior Publication Data
US 2011/0023622 A1    Feb. 3, 2011

Related U.S. Application Data

(60) Provisional application No. 61/039,177, filed on Mar. 25, 2008.

(51) Int. Cl.
*G01F 1/84*     (2006.01)

(52) U.S. Cl.
USPC .................................................. 73/861.357

(58) Field of Classification Search
None
See application file for complete search history.

(56) References Cited

U.S. PATENT DOCUMENTS

| | | | |
|---|---|---|---|
| 4,262,544 A | | 4/1981 | Herzl |
| 4,891,991 A | * | 1/1990 | Mattar et al. .............. 73/861.357 |
| 4,949,583 A | * | 8/1990 | Lang et al. ................ 73/861.357 |
| 5,044,207 A | * | 9/1991 | Atkinson et al. .......... 73/861.357 |
| 5,307,689 A | | 5/1994 | Nishiyama et al. |
| 5,827,979 A | * | 10/1998 | Schott et al. .............. 73/861.357 |
| 6,233,526 B1 | * | 5/2001 | Cunningham .................. 702/45 |

(Continued)

FOREIGN PATENT DOCUMENTS

| | | |
|---|---|---|
| CN | 1942742 A | 4/2007 |
| JP | 06-288806 | 10/1994 |

(Continued)

*Primary Examiner* — Harshad R Patel
(74) *Attorney, Agent, or Firm* — The Ollila Law Group LLC

(57) ABSTRACT

A dual pick-off vibratory flowmeter (100) is provided according to the invention. The dual pick-off vibratory flowmeter (100) includes a first flowtube (102A) and a second flowtube (102B), with the first and second flowtubes (102A, 102B) configured to be vibrated substantially in opposition. The vibratory flowmeter (100) further includes a first pick-off sensor (108) including first and second pick-off portions (108A, 108B) affixed to the first and second flowtubes (102A, 102B), with the first pick-off sensor (108) being located at a first longitudinal location X along the first and second flowtubes (102A, 102B). The vibratory flowmeter (100) further includes a second pick-off sensor (109) including first and second pick-off portions (109A, 109B) affixed to the first and second flowtubes (102A, 102B), with the second pick-off sensor (109) being located substantially at the first longitudinal location X and substantially spaced-apart from the first pick-off sensor (108).

26 Claims, 4 Drawing Sheets

(56) References Cited

U.S. PATENT DOCUMENTS

| | | | |
|---|---|---|---|
| 8,109,154 B2 * | 2/2012 | Pankratz et al. | 73/861.357 |
| 2007/0151368 A1 * | 7/2007 | Hussain et al. | 73/861.357 |
| 2010/0251830 A1 * | 10/2010 | Bitto et al. | 73/861.357 |
| 2011/0016991 A1 * | 1/2011 | Pankratz et al. | 73/861.357 |
| 2012/0048034 A1 * | 3/2012 | Hussain et al. | 73/861.357 |

FOREIGN PATENT DOCUMENTS

| | | |
|---|---|---|
| JP | 6288806 A | 10/1994 |
| JP | 08-254452 | 1/1996 |
| WO | 9608697 A2 | 3/1996 |
| WO | 2005111550 | 11/2005 |

* cited by examiner

SECTION BB

DUAL PICK-OFF VIBRATORY FLOWMETER

BACKGROUND OF THE INVENTION

1. Field of the Invention

The present invention relates to a vibratory flowmeter, and more particularly, to a dual pick-off vibratory flowmeter.

2. Statement of the Problem

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pick-off sensors and processes the signals in order to derive a mass flow rate measurement.

Vibratory flow meters are often used for measuring the mass flow rates of flow fluids at relatively low pressures. However, there is a need for mass flow measurement at very high fluid pressures. Under very high fluid pressure conditions, the flow conduits and other flow handling equipment must by constructed to be heavy and strong.

However, such structural strength makes vibration of a flow meter assembly problematic, as a high-pressure flow meter assembly will be substantially rigid. A high-pressure flow meter assembly also makes measuring a response to the vibration hard to quantify, as the vibrational response will be relatively small due to the rigidity. Additionally, the flowtube vibrational frequency will not be highly affected by the fluid density of the flow material due to the ratio of structural mass to non-structural mass, i.e., the mass of the flow fluid is much less than the mass of the flow conduits. With small changes in frequency, the resulting vibrational amplitude and therefore the resulting pick-off voltage will be at a minimum, resulting in a low meter sensitivity. Discrimination of a relatively small pick-off voltage will be more difficult, as the signal-to-noise ratio will be minimal.

ASPECTS OF THE INVENTION

In one aspect of the invention, a dual pick-off vibratory flowmeter comprises:

a first flowtube and a second flowtube, with the first and second flowtubes configured to be vibrated substantially in opposition;

a first pick-off sensor comprising first and second pick-off portions affixed to the first and second flowtubes, with the first pick-off sensor being located at a first longitudinal location X along the first and second flowtubes; and a second pick-off sensor comprising first and second pick-off portions affixed to the first and second flowtubes, with the second pick-off sensor being located substantially at the first longitudinal location X and substantially spaced-apart from the first pick-off sensor.

Preferably, the first pick-off sensor and the second pick-off sensor are substantially oppositely located on the first and second flowtubes at the first longitudinal location X.

Preferably, the first pick-off sensor and the second pick-off sensor are substantially diametrically opposed on the first and second flowtubes at the first longitudinal location X.

Preferably, the first pick-off sensor is attached at a top region of the first and second flowtubes at the first longitudinal location X and wherein the second pick-off sensor is mounted at a bottom region.

Preferably, the dual pick-off vibratory flowmeter further comprises a third pick-off sensor comprising first and second pick-off portions affixed to the first and second flowtubes, with the third pick-off sensor being located at a second longitudinal location Z along the first and second flowtubes, and a fourth pick-off sensor comprising a first and second pick-off portions affixed to the first and second flowtubes, with the fourth pick-off sensor being located substantially at the second longitudinal location Z and substantially spaced-apart from the third pick-off sensor.

Preferably, the dual pick-off vibratory flowmeter further comprises at least a first driver located at a third longitudinal location Y along the first and second flowtubes.

Preferably, the dual pick-off vibratory flowmeter further comprises a first driver located at a third longitudinal location Y along the first and second flowtubes and a second driver located substantially at the third longitudinal location Y and spaced-apart from the first driver, wherein the first driver and the second driver vibrate the first flowtube and the second flowtube.

Preferably, the first and second pick-off sensors are substantially mass-balanced with respect to the first and second flowtubes.

Preferably, the first and second pick-off sensors are substantially damping-balanced with respect to the first and second flowtubes.

Preferably, the first pick-off portions include hollows and the second pick-off portions at least partially move into the hollows when the first pick-off portions and the second pick-off portions are converging.

In one aspect of the invention, a dual pick-off vibratory flowmeter comprises:

a first flowtube and a second flowtube, with the first and second flowtubes configured to be vibrated substantially in opposition;

a first pick-off sensor comprising first and second pick-off portions affixed to the first and second flowtubes, with the first pick-off sensor being located at a first longitudinal location X along the first and second flowtubes;

a second pick-off sensor comprising first and second pick-off portions affixed to the first and second flowtubes, with the second pick-off sensor being located substantially at the first longitudinal location X and substantially spaced-apart from the first pick-off sensor;

a third pick-off sensor comprising first and second pick-off portions affixed to the first and second flowtubes, with the third pick-off sensor being located at a second longitudinal location Z along the first and second flowtubes; and a fourth pick-off sensor comprising a first and second pick-off portions affixed to the first and second flowtubes, with the fourth pick-off sensor being located substantially at the second longitudinal location Z and substantially spaced-apart from the third pick-off sensor.

Preferably, the first pick-off sensor and the second pick-off sensor are substantially oppositely located on the first and second flowtubes at the first longitudinal location X and wherein the third pick-off sensor and the fourth pick-off sensor are substantially oppositely located on the first and second flowtubes at the second longitudinal location Z.

Preferably, the first pick-off sensor and the second pick-off sensor are substantially diametrically opposed on the first and second flowtubes at the first longitudinal location X and wherein the third pick-off sensor and the fourth pick-off sensor are substantially diametrically opposed on the first and second flowtubes at the second longitudinal location Z.

Preferably, the first pick-off sensor is attached at a top region of the first and second flowtubes at the first longitudinal location X and wherein the second pick-off sensor is mounted at a bottom region and wherein the third pick-off sensor is attached at the top region of the first and second flowtubes at the second longitudinal location Z and the fourth pick-off sensor is attached at the bottom region at the second longitudinal location Z.

Preferably, the dual pick-off vibratory flowmeter further comprises at least a first driver located at a third longitudinal location Y along the first and second flowtubes.

Preferably, the dual pick-off vibratory flowmeter further comprises a first driver located at a third longitudinal location Y along the first and second flowtubes and a second driver located substantially at the third longitudinal location Y and spaced-apart from the first driver, wherein the first driver and the second driver vibrate the first flowtube and the second flowtube.

Preferably, the first and second pick-off sensors and the third and fourth pick-off sensors are substantially mass-balanced with respect to the first and second flowtubes.

Preferably, the first and second pick-off sensors and the third and fourth pick-off sensors are substantially damping-balanced with respect to the first and second flowtubes.

Preferably, the first pick-off portions include hollows and the second pick-off portions at least partially move into the hollows when the first pick-off portions and the second pick-off portions are converging.

In one aspect of the invention, a method of operating a dual pick-off vibratory flowmeter comprises:

vibrating first and second flowtubes of the dual pick-off vibratory flowmeter, with the first and second flowtubes being configured to be vibrated substantially in opposition; and generating a composite signal from first and second pick-off sensors affixed at substantially a first longitudinal location X on the first and second flowtubes, wherein the composite signal is related to the substantially opposing vibrations of the first and second straight flowtubes.

Preferably, the first pick-off sensor and the second pick-off sensor are substantially oppositely located on the first and second flowtubes at the first longitudinal location X.

Preferably, the first pick-off sensor and the second pick-off sensor are substantially diametrically opposed on the first and second flowtubes at the first longitudinal location X.

Preferably, the first pick-off sensor is attached at a top region of the first and second flowtubes at the first longitudinal location X and wherein the second pick-off sensor is mounted at a bottom region at the first longitudinal location X.

Preferably, the first and second pick-off sensors are substantially mass-balanced with respect to the first and second flowtubes.

Preferably, the first and second pick-off sensors are substantially damping-balanced with respect to the first and second flowtubes.

Preferably, the method further comprises generating a second composite signal from third and fourth pick-off sensors affixed at substantially a second longitudinal location Z on the first and second flowtubes, wherein the second composite signal is related to the substantially opposing vibrations of the first and second straight flowtubes.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
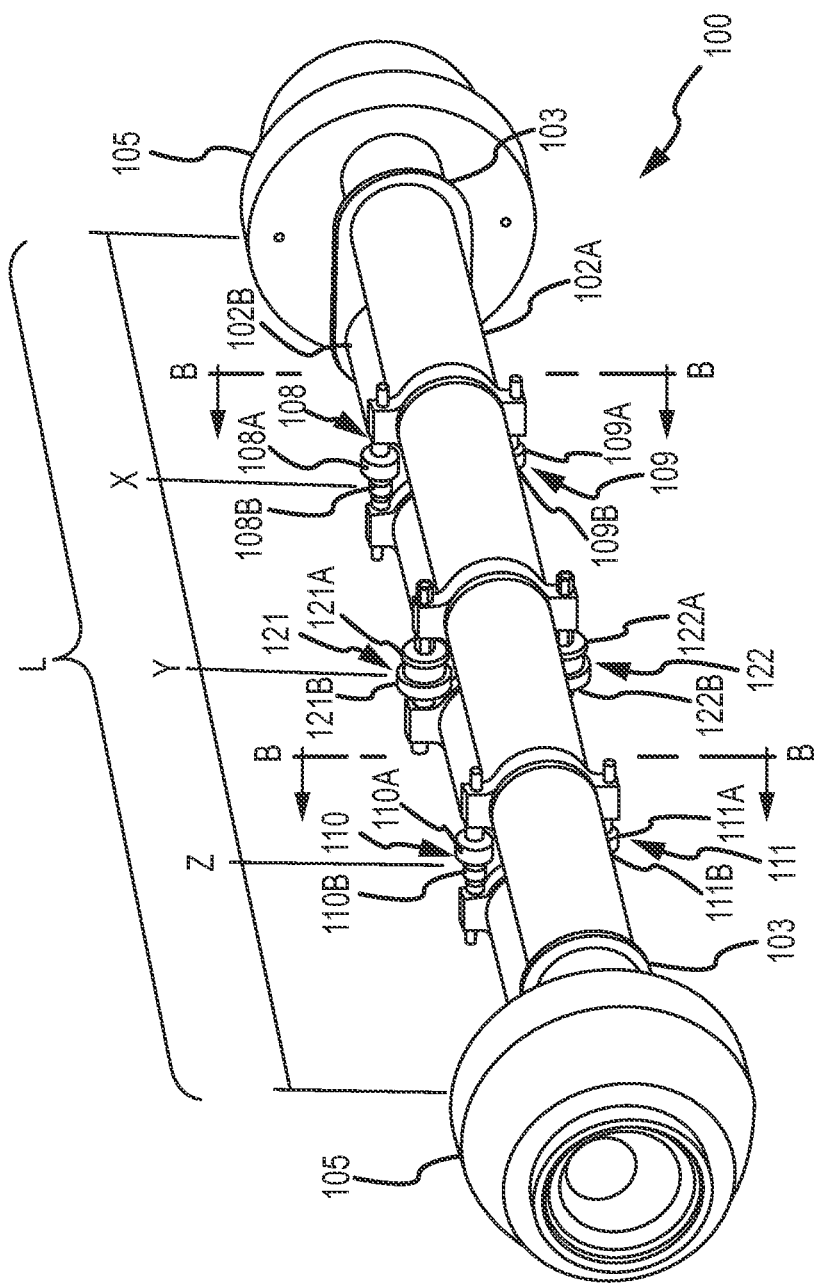
FIG. 1 shows a dual-driver vibratory flowmeter according to an embodiment of the invention.

FIG. 1 shows a dual pick-off vibratory flowmeter 100 according to an embodiment of the invention. The dual pick-off vibratory flowmeter 100 can comprise a Coriolis flowmeter, for example. Alternatively, the dual pick-off vibratory flowmeter 100 can comprise a densitometer. The dual pick-off vibratory flowmeter 100 includes a first flowtube 102A and a second flowtube 102B including a longitudinal length L and end elements 105. Brace bars 103 can be affixed to the flowtubes 102A and 102B and can determine some vibrational characteristics of the dual pick-off vibratory flowmeter 100. The end elements 105 can provide an attachment capability to join the dual pick-off vibratory flowmeter 100 to a pipeline or conduit. In addition, the end elements 105 can provide a flow splitting capability in order to divide a fluid flow substantially between the first flowtube 102A and the second flowtube 102B. The dual pick-off vibratory flowmeter 100 further includes pick-off sensors 108-111 and one or more drivers 121, 122.

The vibratory flowmeter 100 can comprise a straight tube vibratory flowmeter, as shown in the figure. Alternatively, the vibratory flowmeter 100 can employ curved or non-straight flowtubes.

The dual pick-off vibratory flowmeter 100 can be designed for high pressure applications and can be constructed with substantially thick conduit walls. As a result, the flowtube stiffness is very high, yielding a low flowtube vibrational amplitude at the pick-offs. Consequently, the deflections of the flowtubes at the pick-off locations are relatively small. In addition, the flowtube natural vibrational frequency (i.e., resonant frequency) is not highly affected by a fluid density of the flow fluid flowing through the flowtubes due to the ratio of structural mass to nonstructural mass. As a result, changes in vibrational frequency per changes in mass flow rate at a pick-off sensor are relatively minimal, resulting in low sensitivity. An associated meter electronics (not shown) may typically require 50 mV of input in order to accurately measure the vibrational frequency. Due to the small vibrational amplitude, very small voltage amplitudes will be output by the pick-off sensors.

One approach in the prior art is to simply amplify the signals from the pick-off sensors. However, there are practical upper limits to amplification, especially in noisy environments. Amplified noise can make discrimination of the pick-off signals difficult or impossible.

The dual pick-off vibratory flowmeter 100 includes a first pick-off sensor 108 and a second pick-off sensor 109 located at a first longitudinal location X along the first and second flowtubes 102A and 102B. The first pick-off sensor 108 comprises first and second pick-off portions 108A and 108B and the second pick-off sensor 109 comprises first and second pick-off portions 109A and 109B. Although both the first pick-off sensor 108 and the second pick-off sensor 109 are located at the first longitudinal location X, the second pick-off sensor 109 is substantially spaced-apart from the first pick-off sensor 108. In some embodiments, the first pick-off sensor 108 and the second pick-off sensor 109 are substantially oppositely located on the two flowtubes 102A and 102B at the first longitudinal location X. In some embodiments, the first pick-off sensor 108 and the second pick-off sensor 109 are substantially diametrically opposed on the two flowtubes 102A and 102B at the first longitudinal location X. In some embodiments, the first pick-off sensor 108 and the second pick-off sensor 109 are attached or affixed to substantially top and bottom regions of the first and second flowtubes 102A and 102B, as shown in the drawing. Consequently, the first pick-off sensor 108 and the second pick-off sensor 109 are substantially diametrically opposed in location.

In addition, the dual pick-off vibratory flowmeter 100 includes a third pick-off sensor 110 and a fourth pick-off sensor 111 located at a second longitudinal location Z along the first and second flowtubes 102A and 102B. The third pick-off sensor 110 comprises first and second pick-off portions 110A and 110B and the fourth pick-off sensor 111 comprises first and second pick-off portions 111A and 111B. The fourth pick-off sensor 111 is located substantially at the second longitudinal location Z and is spaced-apart from the third pick-off sensor 110. In some embodiments, the third pick-off sensor 110 and the fourth pick-off sensor 111 are substantially oppositely located on the two flowtubes 102A and 102B.

The second longitudinal location Z is spaced-apart from the first longitudinal location X. Consequently, the third and fourth pick-off sensors 110 and 111 are longitudinally spaced-apart from the first and second pick-off sensors 108 and 109.

The dual pick-off vibratory flowmeter 100 further includes one or more drivers 121, 122 positioned at a third longitudinal location Y along the first and second flowtubes 102A and 102B. The one or more drivers 121, 122 vibrate the flowtubes 102A, 102B substantially in opposition, alternately moving the flowtubes 102A, 102B toward and away from each other.

In one embodiment, only a single (i.e., first) driver 121 is needed. In such embodiments (not shown), the single driver may be positioned approximately between the first and second flowtubes 102A and 102B, such as in a gap therebetween.

Alternatively, more than one driver may be needed if the flowtubes 102A, 102B are very stiff. For example, two drivers 121 and 122 can be used in order to achieve a desired vibrational amplitude in the first and second flowtubes 102A and 102B. The two drivers 121 and 122 can be located at the same longitudinal location Y and can vibrate the flowtubes 102A and 102B substantially in unison. The two drivers 121 and 122 can therefore move the flowtubes together and apart.

The third longitudinal location Y is spaced-apart from both the first longitudinal location X and the second longitudinal location Z. In some embodiments, the third longitudinal location Y can be substantially centered between the first longitudinal location X and the second longitudinal location Z.

Each pick-off sensor 108-111 comprises two pick-off portions that are coupled to respective flowtubes. The pick-off sensor 108 comprises a first pick-off portion 108A coupled to the first flowtube 102A and a second pick-off portion 108B coupled to the second flowtube 102B. The pick-off sensor 109 comprises a first pick-off portion 109A coupled to the first flowtube 102A and a second pick-off portion 109B coupled to the second flowtube 102B. The pick-off sensor 110 comprises a first pick-off portion 110A coupled to the first flowtube 102A and a second pick-off portion 110B coupled to the second flowtube 102B. The pick-off sensor 111 comprises a first pick-off portion 111A coupled to the first flowtube 102A and a second pick-off portion 111B coupled to the second flowtube 102B.

The oppositional movement of the flowtubes results in the two corresponding pick-off portions moving toward and away from each other, resulting in a relative movement of the two pick-off portions, diverging and converging during vibrations of the flowtubes 102A and 102B. This also results in a generated pick-off voltage signal.

In some embodiments, the first pick-off portions 108A-111A are at least partially hollow and the second pick-off portions 108B-111B at least partially move into the hollow regions 150 when the first pick-off portions 108A-111A and the second pick-off portions 108B-111B are converging. Alternatively, the pick-offs can have other cooperating shapes.

In the embodiment shown in the figure, the dual pick-off vibratory flowmeter 100 includes first and second drivers 121 and 122. The first and second drivers 121 and 122 act together in order to vibrate the flowtubes in opposition. The two drivers combined offer an increased drive power. The first driver 121 comprises a first driver portion 121A coupled to the first flowtube 102A and a second driver portion 121B coupled to the second flowtube 102B. The second driver 122 comprises a first driver portion 122A coupled to the first flowtube 102A and a second driver portion 122B coupled to the second flowtube 102B.

In some embodiments, the first driver portions 121A/122A are at least partially hollow and the second driver portions 121B/122B at least partially move into the hollow regions when the first driver portions 121A/122A and the second driver portions 121B/122B are converging (i.e., they are moving toward each other). Alternatively, the drivers can have other cooperating shapes.

The dual balanced driver arrangement is in contrast to the prior art. In one prior art approach, a single driver is used wherein the two driver components are located to act on the centers of one or two flowtubes. Alternatively, in another prior art driver design, a prior art driver can be offset from a flowtube centerline and consequently can include mass balances on the opposite sides of the flowtubes in order to balance the mass of the two prior art driver components.

The first driver 121 and the second driver 122 are substantially mass-balanced with respect to the first and second flowtubes 102A and 102B. The first driver 121 and the second driver 122 together effectively operate on about a center of the first and second flowtubes 102A and 102B. Consequently, the first driver 121 and the second driver 122 do not place any twisting forces or torques on the first and second flowtubes 102A and 102B. The first driver 121 and the second driver 122 in some embodiments are substantially diametrically opposed on the first and second flowtubes 102A and 102B at the third longitudinal location Y.

In the embodiment shown in the figure, the first driver 121 is attached to and extends from a substantially top region of the first and second flowtubes 102A and 102B. Correspondingly, the second driver 122 is attached to and extends from a substantially bottom region of the first and second flowtubes 102A and 102B. As a result, the first driver 121 and the second driver 122 expand and contract substantially in unison in order to move the first and second flowtubes 102A and 102B together and apart in an oppositional vibratory motion. Further, the substantially balanced arrangement of the drivers 121 and 122 ensures that damping forces are likewise substantially balanced.

Figure 2:
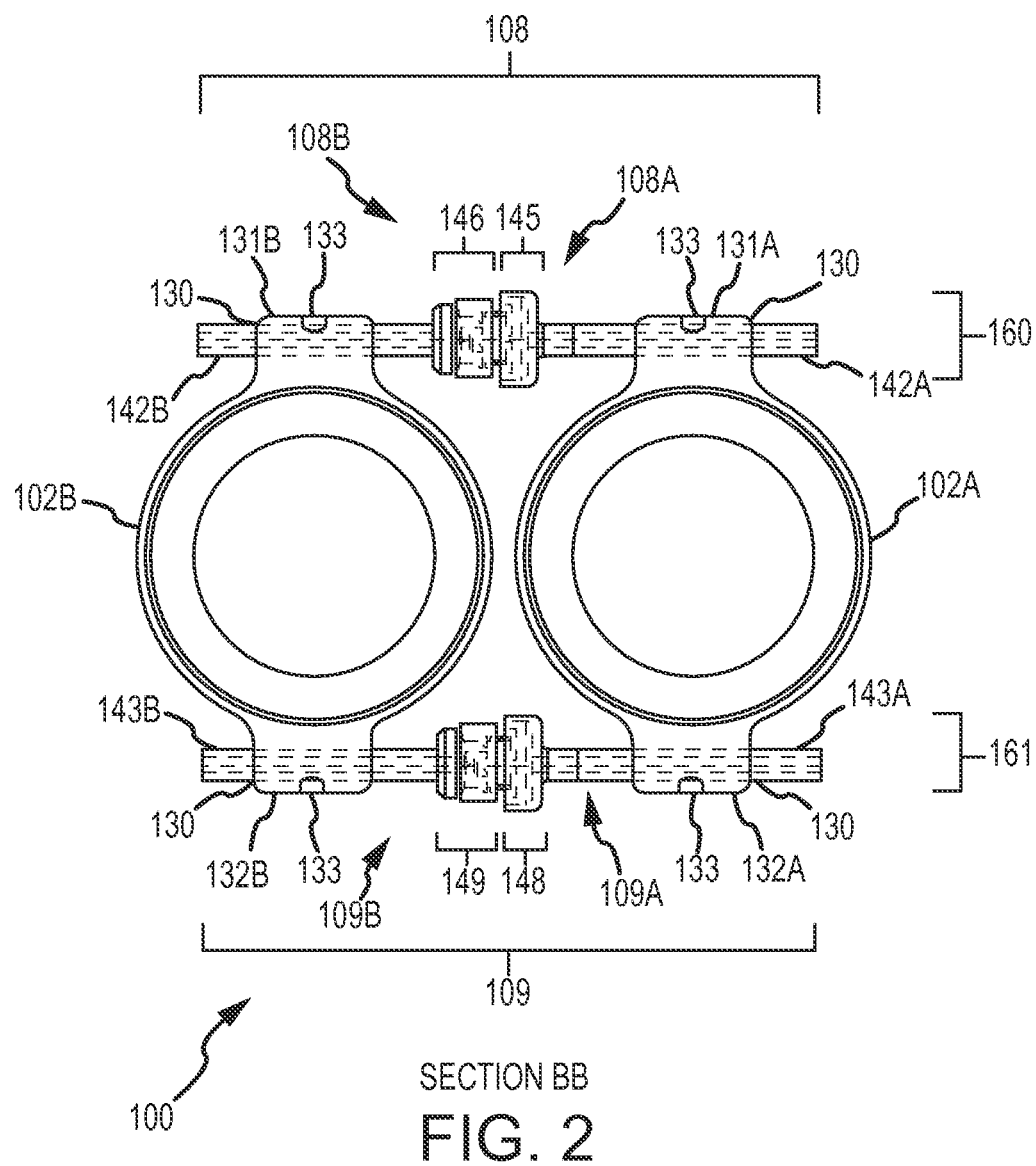
FIG. 2 is a cross-sectional view BB of the dual pick-off vibratory flowmeter according to an embodiment of the invention.

FIG. 2 is a cross-sectional view BB of the dual pick-off vibratory flowmeter 100 according to an embodiment of the invention. The cross-section BB is taken at the longitudinal position X in the figure. The cross-section shows the first and second flowtubes 102A and 102B and shows associated mounting elements 131A and 131B and mounting elements 132A and 132B that extend from the first and second flowtubes 102A and 102B. The mounting elements include mounting bores 130 that receive a portion of the respective pick-off portions 108A/108B and 109A/109B, enabling attachment of the first and second pick-off sensors 108 and 109. The mounting elements can further include fastener bores 133 that can receive set-screws or other fasteners that enable the pick-off sensors 108 and 109 to be adjustably affixed to the first and second flowtubes 102A and 102B in the mounting bores 130, controlling the relative positions of the pick-off portions.

The pick-off sensor 108 comprises the first pick-off portion 108A and the second pick-off portion 108B, as previously discussed. Likewise, the pick-off sensor 109 comprises the first pick-off portion 109A and the second pick-off portion 109B, as was also previously discussed.

The first pick-off portion 108A comprises a mounting extension 142A joined to a permanent magnet portion 145. The second pick-off portion 108B comprises a mounting extension 142B joined to a coil portion 146. Likewise, the first pick-off portion 109A comprises a mounting extension 143A joined to a permanent magnet portion 148 and the second pick-off portion 109B comprises a mounting extension 143B joined to a coil portion 149. Wires or wireless signal communication means (not shown) can transfer electrical signals from the coil portions 146 and 149 to meter electronics or other processing device, including a remote device, for example. When vibrated, the coil portions 146 and 149 generate electrical currents in response to motions toward and away from the permanent magnet portions 145 and 148. As a result, the vibration of the first and second flowtubes 102A and 102B generate electrical signals in the pick-off sensors 108 and 109 (and likewise in the pick-off sensors 110 and 111). The frequency and amplitude of the resulting electrical signals will reflect the vibrational frequency and amplitude of the vibration of the flowtubes 102A and 102B.

In the embodiment shown, the mounting elements 131A and 131B are located at a top region 160 of the first and second flowtubes 102A and 102B while the mounting elements 132A and 132B are located at a bottom region 161. The mounting elements 132A and 132B are therefore substantially diametrically opposed on the flowtubes from the mounting elements 131A and 131B. Consequently, the first pick-off sensor 108 is substantially diametrically opposed from the second pick-off sensor 109. The first pick-off sensor 108 therefore acts on the top region 160 and the second pick-off sensor 109 acts on the bottom region 161. However, other locations are contemplated and are within the scope of the description and claims. The top and bottom regions 150 and 151 are labeled merely for illustration, and do not limit the pick-offs 108-111 (or the vibratory flowmeter 100, for that matter) to any particular orientation.

Advantageously, the opposed positioning of the first pick-off sensor 108 from the second pick-off sensor 109 may obviate the need for any mass balancing. A single unbalanced pick-off will generate a mass moment, as well as a moment due to the damping force. If unbalanced, these moments will generate twisting or torque forces on the flow tubes. This twist is a source of measurement error, as well as creating unwanted vibrational modes.

One of the advantages of the dual pickoff system according to the invention is that an identical pick-off mounted in a position circumferentially opposed to its longitudinally positioned partner provides a simple method of balancing both the effects of mass and of a damping characteristic of the driver or pick-off system. Although the mass of a single pick-off or driver can be balanced with an opposing mass or balance weight, the damping associated with the work done to generate an electrical pick-off signal or a drive force is not so easily balanced. These forces can be balanced by providing an identical magneto-electrical element mounted on the opposite side of the same flow tube.

If torsional twisting does occur, the locations of the dual pick-offs will cancel out any torsional movement readings, with only lateral vibrational movements being detected and quantified at a vibrational signal processing device. Further, the positioning enables two pick-off sensors to generate additive signals, enhancing the vibrational determination of the vibratory flowmeter 100.

Figure 3:
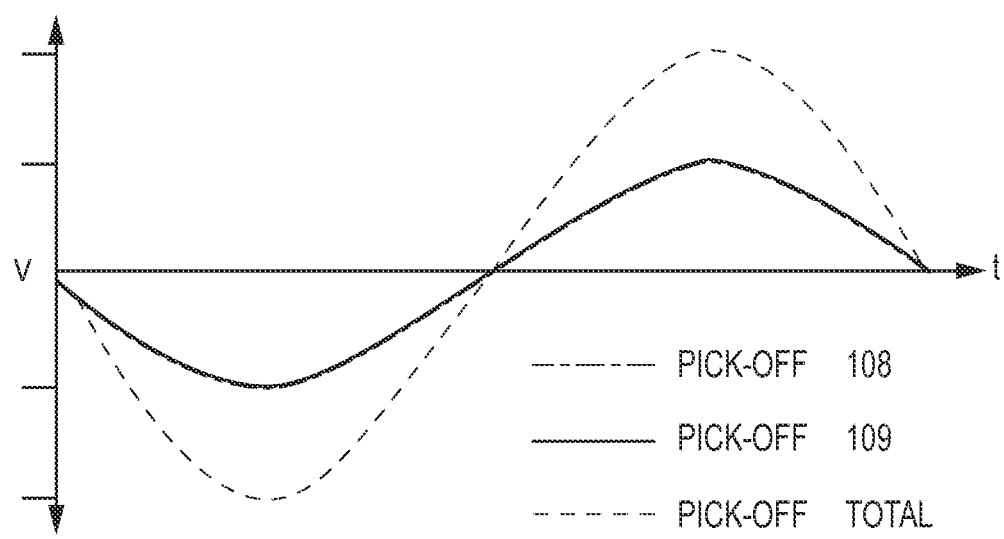
FIG. 3 is a graph of the responses of a pair of co-located pick-off sensors.

FIG. 3 is a graph of the responses of a pair of co-located pick-off sensors (such as the pick-off sensor 108 and the pick-off sensor 109, for example). It can be seen from the graph that a first vibrational response generated by the pick-off sensor 108 will have substantially the same amplitude as a second vibrational response generated by the pick-off sensor 109. By being co-located at substantially the same longitudinal position on the first and second flowtubes 102A and 102B, the first and second vibrational responses will exhibit substantially the same response frequencies and phases. Consequently, the first and second vibrational responses can be added together, as shown by the "total" line of the graph. The additive vibrational response produces a better measurement signal, including an increased signal amplitude, that can subsequently be used to quantify one or more flow characteristics of a flow material in the first and second flowtubes 102A and 102B.

It should be understood that the above discussion also applies to the pick-off sensors 110 and 111. As a result, the four pick-off sensors 108-111 produce two larger, stronger composite signals that can be better used for quantifying flow characteristics.

Figure 4:
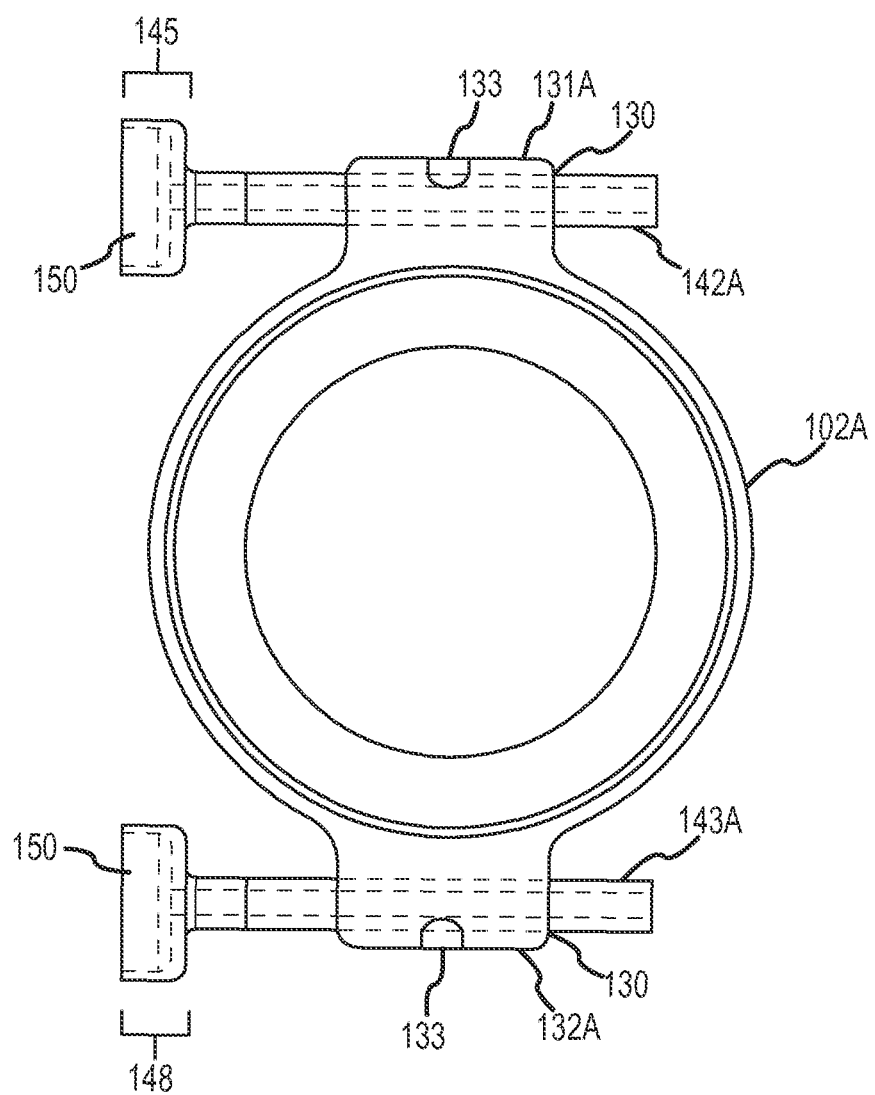
FIG. 4 is a cross-sectional view of just the first flowtube.

FIG. 4 is a cross-sectional view of just the first flowtube 102A. In some embodiments, the permanent magnet portions 145 and 148 include at least partially hollow regions 150. However, the at least partially hollow regions are not required. The permanent magnet portions 145 and 148 can be formed of a magnetic material that interacts with and generates electrical currents in the coil portions 146 and 149 as the coil portions 146 and 149 move with respect to the permanent magnet portions 145 and 148.

What is claimed is:

1. A dual pick-off vibratory flowmeter (100), comprising:
a first flowtube (102A) and a second flowtube (102B), with the first and second flowtubes (102A, 102B) configured to be vibrated substantially in opposition;
a first pick-off sensor (108) comprising first and second pick-off portions (108A, 108B) adjustably affixed to the first and second flowtubes (102A, 102B) with fasteners (133) in mounting elements (131A, 131B) extending from the first and second flowtubes (102A, 102B), with the first pick-off sensor (108) being located at a first longitudinal location X along the first and second flowtubes (102A, 102B); and
a second pick-off sensor (109) comprising first and second pick-off portions (109A, 109B) adjustably affixed to the first and second flowtubes (102A, 102B) with fasteners (133) in mounting elements (132A, 132B) extending from the first and second flowtubes (102A, 102B), with the second pick-off sensor (109) being located substantially at the first longitudinal location X and substantially spaced-apart from the first pick-off sensor (108).

2. The dual pick-off vibratory flowmeter (100) of claim 1, wherein the first pick-off sensor (108) and the second pick-off sensor (109) are substantially oppositely located on the first and second flowtubes (102A, 102B) at the first longitudinal location X.

3. The dual pick-off vibratory flowmeter (100) of claim 1, wherein the first pick-off sensor (108) and the second pick-off sensor (109) are substantially diametrically opposed on the first and second flowtubes (102A, 102B) at the first longitudinal location X.

4. The dual pick-off vibratory flowmeter (100) of claim 1, wherein the first pick-off sensor (108) is attached at a top region (160) of the first and second flowtubes (102A, 102B) at the first longitudinal location X and wherein the second pick-off sensor (108) is mounted at a bottom region (161).

5. The dual pick-off vibratory flowmeter (100) of claim 1, further comprising:
a third pick-off sensor (110) comprising first and second pick-off portions (110A, 110B) adjustably affixed to the first and second flowtubes (102A, 102B) with fasteners (133) in mounting elements (131A, 131B) extending from the first and second flowtubes (102A, 102B), with the third pick-off sensor (110) being located at a second longitudinal location Z along the first and second flowtubes (102A, 102B); and
a fourth pick-off sensor (111) comprising a first and second pick-off portions (111A, 111B) adjustably affixed to the first and second flowtubes (102A, 102B) with fasteners (133) in mounting elements (132A, 132B) extending from the first and second flowtubes (102A, 102B), with the fourth pick-off sensor (111) being located substantially at the second longitudinal location Z and substantially spaced-apart from the third pick-off sensor (110).

6. The dual pick-off vibratory flowmeter (100) of claim 1, further comprising at least a first driver (121) located at a third longitudinal location Y along the first and second flowtubes (102A, 102B).

7. The dual pick-off vibratory flowmeter (100) of claim 1, further comprising:
a first driver (121) located at a third longitudinal location Y along the first and second flowtubes (102A, 102B); and
a second driver (122) located substantially at the third longitudinal location Y and spaced-apart from the first driver (121), wherein the first driver (121) and the second driver (122) vibrate the first flowtube (102A) and the second flowtube (102B).

8. The dual pick-off vibratory flowmeter (100) of claim 1, wherein the first and second pick-off sensors (108) and (109) are substantially mass-balanced with respect to the first and second flowtubes (102A, 102B).

9. The dual pick-off vibratory flowmeter (100) of claim 1, wherein the first and second pick-off sensors (108) and (109) are substantially damping-balanced with respect to the first and second flowtubes (102A, 102B).

10. The dual pick-off vibratory flowmeter (100) of claim 1, wherein the first pick-off portions (108A, 109A) include hollows (150) and wherein the second pick-off portions (108B, 109B) at least partially move into the hollows (150) when the first pick-off portions (108A, 109A) and the second pick-off portions (108B, 109B) are converging.

11. A dual pick-off vibratory flowmeter (100), comprising:
a first flowtube (102A) and a second flowtube (102B), with the first and second flowtubes (102A, 102B) configured to be vibrated substantially in opposition;
a first pick-off sensor (108) comprising first and second pick-off portions (108A, 108B) adjustably affixed to the first and second flowtubes (102A, 102B) with fasteners (133) in mounting elements (131A, 131B) extending from the first and second flowtubes (102A, 102B), with the first pick-off sensor (108) being located at a first longitudinal location X along the first and second flowtubes (102A, 102B);
a second pick-off sensor (109) comprising first and second pick-off portions (109A, 109B) adjustably affixed to the first and second flowtubes (102A, 102B) with fasteners (133) in mounting elements (132A, 132B) extending from the first and second flowtubes (102A, 102B) with the second pick-off sensor (109) being located substantially at the first longitudinal location X and substantially spaced-apart from the first pick-off sensor (108);
a third pick-off sensor (110) comprising first and second pick-off portions (110A, 110B) adjustably affixed to the first and second flowtubes (102A, 102B) with fasteners (133) in mounting elements (131A, 131B) extending from the first and second flowtubes (102A, 102B), with the third pick-off sensor (110) being located at a second longitudinal location Z along the first and second flowtubes (102A, 102B); and
a fourth pick-off sensor (111) comprising a first and second pick-off portions (111A, 111B) adjustably affixed to the first and second flowtubes (102A, 102B) with fasteners (133) in mounting elements (132A, 132B) extending from the first and second flowtubes (102A, 102B), with the fourth pick-off sensor (111) being located substantially at the second longitudinal location Z and substantially spaced-apart from the third pick-off sensor (110).

12. The dual pick-off vibratory flowmeter (100) of claim 11, wherein the first pick-off sensor (108) and the second pick-off sensor (109) are substantially oppositely located on the first and second flowtubes (102A, 102B) at the first longitudinal location X and wherein the third pick-off sensor (110) and the fourth pick-off sensor (111) are substantially oppositely located on the first and second flowtubes (102A, 102B) at the second longitudinal location Z.

13. The dual pick-off vibratory flowmeter (100) of claim 11, wherein the first pick-off sensor (108) and the second pick-off sensor (109) are substantially diametrically opposed on the first and second flowtubes (102A, 102B) at the first longitudinal location X and wherein the third pick-off sensor (110) and the fourth pick-off sensor (111) are substantially diametrically opposed on the first and second flowtubes (102A, 102B) at the second longitudinal location Z.

14. The dual pick-off vibratory flowmeter (100) of claim 11, wherein the first pick-off sensor (108) is attached at a top region (160) of the first and second flowtubes (102A, 102B) at the first longitudinal location X and wherein the second pick-off sensor (108) is mounted at a bottom region (161) and wherein the third pick-off sensor (110) is attached at the top region (160) of the first and second flowtubes (102A, 102B) at the second longitudinal location Z and the fourth pick-off sensor (111) is attached at the bottom region (161) at the second longitudinal location Z.

15. The dual pick-off vibratory flowmeter (100) of claim 11, further comprising at least a first driver (121) located at a third longitudinal location Y along the first and second flowtubes (102A, 102B).

16. The dual pick-off vibratory flowmeter (100) of claim 11, further comprising:
a first driver (121) located at a third longitudinal location Y along the first and second flowtubes (102A, 102B); and
a second driver (122) located substantially at the third longitudinal location Y and spaced-apart from the first driver (121), wherein the first driver (121) and the second driver (122) vibrate the first flowtube (102A) and the second flowtube (102B).

17. The dual pick-off vibratory flowmeter (100) of claim 11, wherein the first and second pick-off sensors (108) and (109) and the third and fourth pick-off sensors (110) and (111) are substantially mass-balanced with respect to the first and second flowtubes (102A, 102B).

18. The dual pick-off vibratory flowmeter (100) of claim 11, wherein the first and second pick-off sensors (108) and (109) and the third and fourth pick-off sensors (110) and (111) are substantially damping-balanced with respect to the first and second flowtubes (102A, 102B).

19. The dual pick-off vibratory flowmeter (100) of claim 11, wherein the first pick-off portions (108A, 109A) include hollows (150) and wherein the second pick-off portions (108B, 109B) at least partially move into the hollows (150) when the first pick-off portions (108A, 109A) and the second pick-off portions (108B, 109B) are converging.

20. A method of operating a dual pick-off vibratory flowmeter, the method comprising:
vibrating first and second flowtubes of the dual pick-off vibratory flowmeter, with the first and second flowtubes being configured to be vibrated substantially in opposition; and
generating a composite signal from first and second pick-off sensors adjustably affixed at substantially a first longitudinal location X on the first and second flowtubes with fasteners in mounting elements extending from the flowtubes, wherein the composite signal is related to the substantially opposing vibrations of the first and second straight flowtubes.

21. The method of claim 20, wherein the first pick-off sensor and the second pick-off sensor are substantially oppositely located on the first and second flowtubes at the first longitudinal location X.

22. The method of claim 20, wherein the first pick-off sensor and the second pick-off sensor are substantially diametrically opposed on the first and second flowtubes at the first longitudinal location X.

23. The method of claim 20, wherein the first pick-off sensor is attached at a top region of the first and second flowtubes at the first longitudinal location X and wherein the second pick-off sensor is mounted at a bottom region at the first longitudinal location X.

24. The method of claim 20, wherein the first and second pick-off sensors are substantially mass-balanced with respect to the first and second flowtubes.

25. The method of claim 20, wherein the first and second pick-off sensors are substantially damping-balanced with respect to the first and second flowtubes.

26. The method of claim 20, further comprising:
generating a second composite signal from third and fourth pick-off sensors adjustably affixed at substantially a second longitudinal location Z on the first and second flowtubes with fasteners in mounting elements extending from the first and second flowtubes, wherein the second composite signal is related to the substantially opposing vibrations of the first and second straight flowtubes.

* * * * *